United States Patent [19]

Selby

[11] Patent Number: 4,709,952
[45] Date of Patent: Dec. 1, 1987

[54] CHOKER HOOK ASSEMBLY

[75] Inventor: John S. Selby, Puyallup, Wash.

[73] Assignee: Weyerhaeuser Company, Tacoma, Wash.

[21] Appl. No.: 936,526

[22] Filed: Dec. 1, 1986

[51] Int. Cl.[4] .................................................. B66C 1/38
[52] U.S. Cl. .............................. 294/82.14; 294/82.3; 294/82.34; 294/75; 294/905
[58] Field of Search ............... 294/82.14, 82.34, 82.24, 294/82.25, 82.23, 82.29, 82.30, 82.31, 75, 905; 24/238, 239, 241 P, 241 PS, 241 SL

[56] References Cited

U.S. PATENT DOCUMENTS 3,104,909  9/1963  Walker .................................. 294/75
4,358,144  11/1982  Schmidt et al. ................... 294/82.14
4,417,758  11/1983  Vaders ............................. 294/82.14

Primary Examiner—James B. Marbert

[57] ABSTRACT

In logging and other handling operations a cable is looped about an elongated object and cinched tight through a choker hook assembly in order to transport the objects. A remotely controlled hook assembly has a body and a releasable latch arm through which the cable passes and which grasps the end of the cable. A recessed knob socket is located on the outside of the hook body for acceptance of the knob mounted at the cable end. Within the body a slidable pin functions to hold and then release the latch arm upon remote command. The slidable pin can be reset by using the pivotal latch arm in combination with the cable and knob as leverage.

11 Claims, 5 Drawing Figures

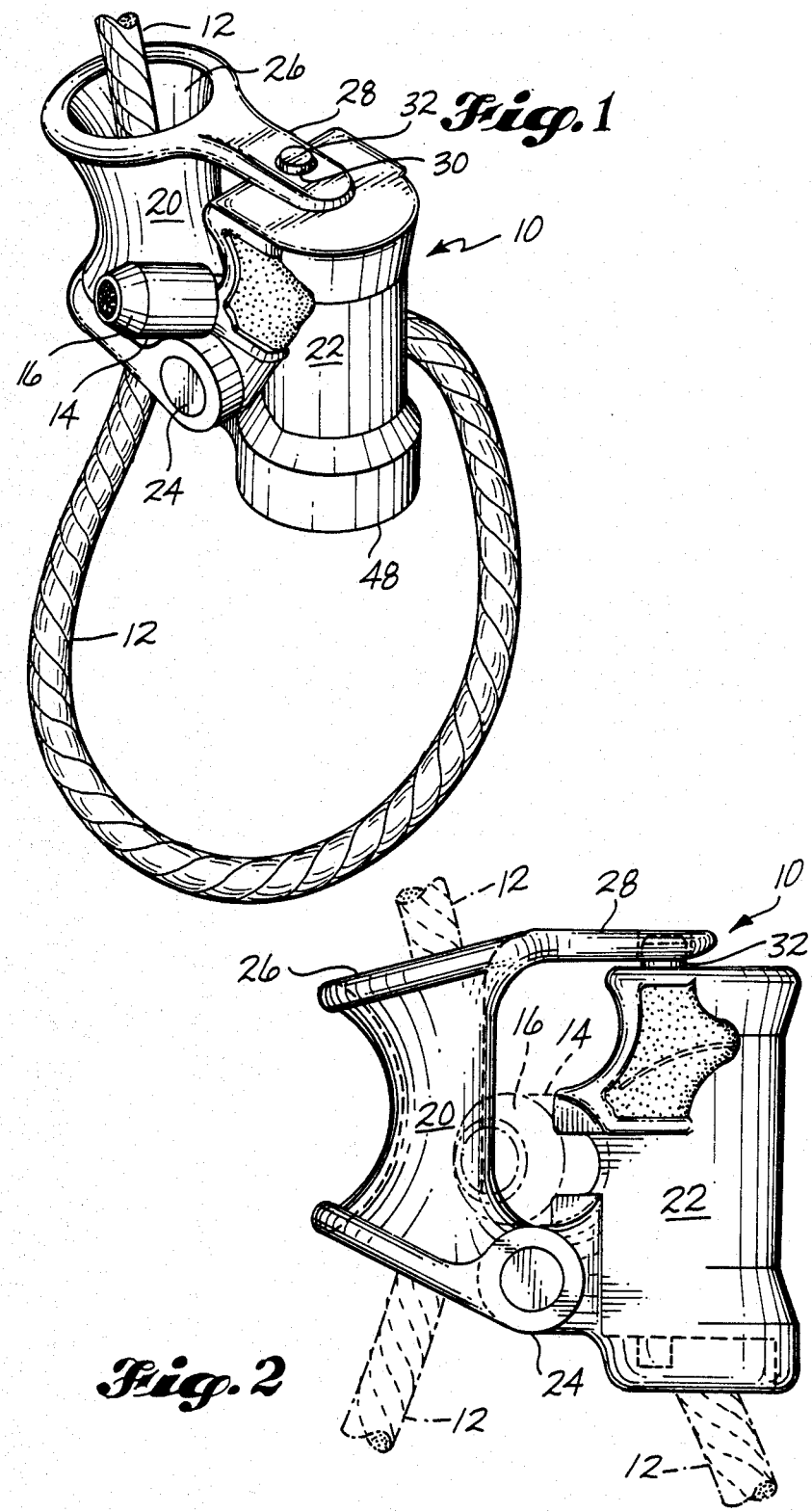

4,709,952

1

CHOKER HOOK ASSEMBLY

BACKGROUND OF THE INVENTION

This invention relates generally to log handling systems for use in the woods or other elongated object handling systems, but more particularly to a remotely controlled choker hook and release system.

It is common practice in woods operations where trees are being harvested and logs moved about to utilize cable handling systems either at ground level or overhead yarding systems. As a part of these log handling systems, steel cables are wrapped about felled trees to form a noose or choker. The cable, once looped around a tree or a plurality of trees, is attached back onto itself, using a special device referred to as a choker hook which allows the loop to tighten about the tree. The tightened loop serves to hold it as the cable is then tensioned to lift the tree and pull it to the desired location. Once the logs arrive at the desired location, the choker must then be released in order to release the tree. The typical way choker hooks are now released is by manual labor. Physically releasing the chokers can be hazardous, and it takes time and delays production.

In the past, others have designed remotely controlled self-releasing choker mechanisms and one such example may be seen by referring to U.S. Pat. No. 3,104,909 issued in 1963 to W. M. Walker. In the Walker patent, a choker hook is disclosed where the end of a cable has a ferrule or knob affixed to it which is seated and held within the choker hook casing. A pivotally mounted locking arm is controlled in part by a servo for holding and releasing the end of the cable. There are certain shortcomings in the Walker choker hook, among them being its lack of flexibility, openness, complexity, size and cost. These disadvantages have been overcome by the invention disclosed in U.S. Pat. No. 4,417,758—Vaders, assigned to the assignee of the present invention. The disclosure of U.S. Pat. No. 4,417,758 is hereby incorporated herein by reference.

After the remotely releasable choker of U.S. Pat. No. 4,417,758 had been used in the woods certain ideas were conceived to provide improved performance. For example, when operating the radio controlled choker disclosed in the aforementioned patent it was necessary to latch the arm after wrapping the cable about the object and lodging the cable and knob between the the latch arm and choker housing. The operator had to make sure the cable was in place before closing the latch arm. This was in effect a "three handed" operation.

In addition, the cable and knob when locked in place and after tension was applied to lift a load were bent about an angle relative to the latch arm. It was determined this could lead to greater stresses than would otherwise be desirable on the assembly, resulting in kinked cable and the kinked end proved difficult to manipulate under logs.

In U.S. Pat. No. 4,569,548 also assigned to the assignee of the present invention a cocking cam is disclosed that allows an operator to easily cock the slidable pin in place by using the leverage obtained from employing the latch arm as a lever arm. It was determined that while this improvement provided easy setting of the pin it often caused the pin to be driven violently upward thereby resulting in unwanted maintenance requirements.

Thus, from the foregoing, one object of the present invention is to make the cable looping and securing process easier for the operator.

Another object is to reduce the stresses and kinking on the end of the cable below its knob by maximizing the radius over which the cable is bent where it enters the latch arm.

Still a further object is to reduce the rigidity of the cocking cam in order to reduce forces on the slidable pin when it is moved upwardly and locked in place.

These and other objects of the invention will become apparent when reading the specification to follow in conjunction with the attached drawings.

BRIEF SUMMARY OF THE INVENTION

Briefly, this invention is practiced in one form by an improved latch arm and choker body assembly where the latch arm and body or housing form a structured aperture when the arm is locked to the body. The aperture is structured to form a first opening large enough in size to accept the knob and have it pass there through with the trailing cable. A second opening is adjacent the first opening and separated by a gap large enough to allow only the cable to pass. A recess is located on the body adjacent the second opening against which an edge on the knob will rest when tension is applied to the trailing cable. Preferably the recessed face is at an angle of about 30° from a plane through the pin and arm in order to minimize the angle through which the cable is bent where it enters the latch arm. When the body is set backwards or the log upends, the cable is bent around the larger radius of the body, rather than the small radius of the latch arm, thus minimizing kinking.

In another embodiment the improvement is comprised of locating the eye through which the cable slides on the outer side of the latch arm and in line with the location on the bottom of the choker body where the slidable pin will exit when it is in its retracted position. A lip surrounds the bottom edge of the body and has an opening to accept the entry of the knob when it is forced upwardly against the bottom face of the pin by leverage from the latch arm.

BRIEF DESCRIPTION OF THE DRAWINGS

FIG. 1 is an isometric view of a choker housing with the latch arm locked in place and the cable loop and knob in place.

FIG. 2 is a side elevation view also showing the cable knob in place illustrating how it rests in the recess on the choker body.

DETAILED DESCRIPTION OF THE PREFERRED EMBODIMENTS

Figure 4:
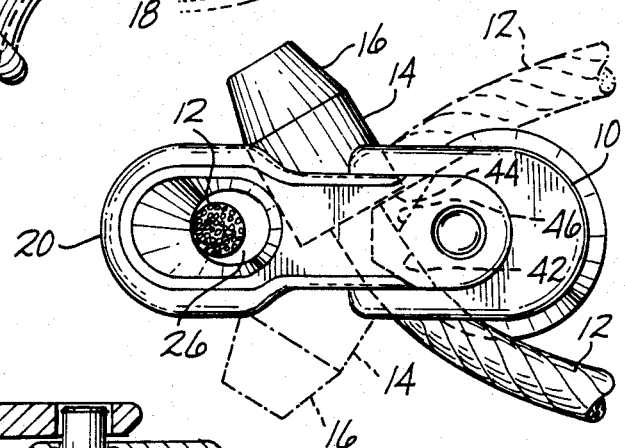
FIG. 4 is a top plan view showing a cable and knob in place with the latch arm locked.

Referring first to FIG. 1, the entire remotely-controlled choker hook assembly is indicated at 10. An elongated cable (usually high-strength wire cable) 12 extends back to a yarding system or some other means for manipulating the tension on cable 12. At the extreme end of cable 12 is a knob or ferrule 14 firmly attached to the cable end. Knob 14 is approximately twice the diameter at its largest point of the cable diameter. Usually the uppermost portion of knob 14 will be comprised of an inclined edge 16 to make the knob easily insertable into various receptacles, e.g., between tight logs. At the opposite end of knob 14 is a circumferentially extending substantially flat surface 18 (see FIGS. 4 and 5) that often serves to grasp an object in which the knob is positioned. In the embodiment depicted in FIG. 1 the pivotal latch arm 20 is attached to choker body 22 at pinned connection 24. Latch arm 20 has an eye 26 associated therewith through which cable 12 passes. Latch arm 20 is similar to the latch arm as disclosed in the aforementioned U.S. Pat. Nos. 4,417,758 and 4,569,548 in that the pinned connection 24 is located towards the bottom of choker body 22 and in that within the upper portion of arm 20 a laterally extending locking arm 28 is functional to engage the end of slidable pin 32. Eye 26 in the preferred embodiment is a cast portion of latch arm 20. Located at the outer end of the lateral portion 28 is a substantially circular aperture 30 which is slightly larger than the diameter of slidable pin 32.

Figure 5:
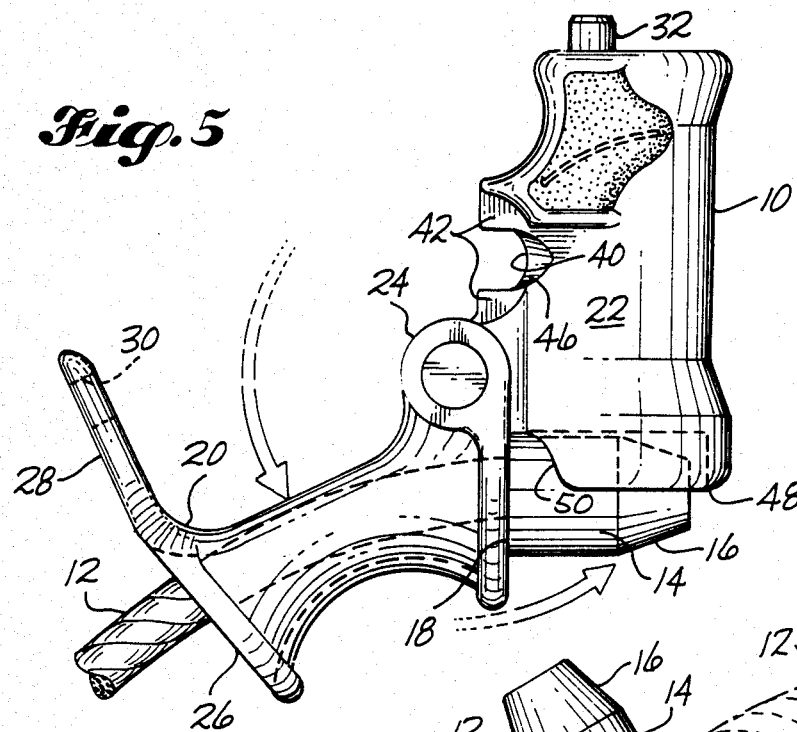
FIG. 5 is a side elevation view showing the cable knob and latch arm being used to set the slidable pin in its upper position to receive the aperture within the upper end of the latch arm.
Figure 3:
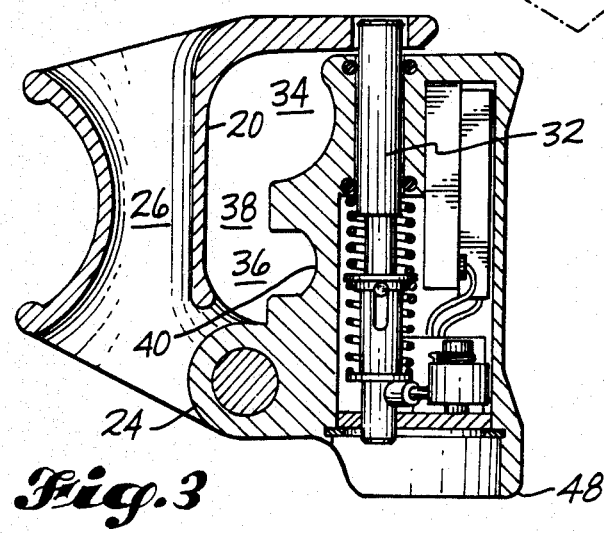
FIG. 3 is a side cross sectional view showing the internal components of the body and the adjacent openings between the body and locked latch arm.

In the remotely releasable choker design disclosed in U.S. Pat. No. 4,417,758 the latch arm and choker body assembly cooperate to form a simple holding socket in which the end of the cable and its knob would be held. As previously mentioned, it was difficult for an operator to form his loop about the object and then locate the end of the cable in the receptacle while substantially simultaneously trying to move the latch arm into its locked position over the upwardly extending slidable pin. In the present invention, as best depicted in FIGS. 2, 3 and 5 the means for inserting the cable end within the choker hook assembly 10 and then retaining it is improved over the known retaining means disclosed in the aforementioned patents. The latch arm can be and usually is latched before the choker knob is inserted. Along the edge of choker body 22 adjacent the innermost edge of latch arm 20 specific contours are provided in order to define adjacent first and second openings 34, 36 in the choker hook assembly when the latch arm 20 is in its locked position. Each opening is defined in part by a portion of the choker body and a portion of the latch arm with a gap 38 extending between the first and second openings 34, 36. First opening 34 is sized so that the knob 14 can pass through it unobstructed and gap 38 is sized so that the smaller cable 12 can slide freely through the gap. At second opening 36 the widest dimension within second opening 36 is less than the largest dimension on knob 14 so as to prevent knob 14 from passing through second opening 36. Within second opening 36 is a structured recessed portion shown generally at 40 in FIG. 3. At recessed portion 40 a pair of inclined faces 42, 44 are cast or otherwise created on choker body 22. Each face 42, 44 is at an angle of approximately 30° from a plane extending through slidable pin 32 and the centerline of eye 26. As will be apparent, once the cable and knob are moved into second opening 36 and tension exerted on cable 12, the circumferential surface 18 on knob 14 will rest against one or the other of inclined surfaces 42, 44 depending upon which side the knob entered the choker hook assembly. Based on the way tension is applied to the cable once the knob is in place, the angle cable 12 makes with the choker hook assembly will be reduced. Ideally the cable angle on entry should fall within a range of from approximately 0°-60° when measured between the plane through the slidable pin and latch arm. An even more preferred range is from 25°-35°. Relief 46 is provided in choker body 22 below faces 42, 44 to further provide clearance for the cable.

Briefly, to explain the operation of remotely releasable choker hook assembly 10, reference will be made to FIG. 3. The internal construction of choker body 22 is substantially like that as disclosed in the aforementioned U.S. Patents assigned to the assignee of the present invention. Slidable pin 32 operates between a fully retracted position and an upwardly extending locked but spring biased position as depicted in FIG. 3. A small radio receiver is located within body 22 and the associated mechanism functions upon command to remove the support holding slidable pin in its uppermost position and to periodically, upon command, reinstitute that support to allow the pin to be repositioned in its upper position.

Located around substantially the entire bottom edge of choker body 22 is a downwardly extending lip 48 but which has an opening therein at 50 which has a width slightly larger than the largest dimension on knob 14. The height of lip 48 is selected to be slightly greater than the exposed dimension of slidable pin 32 when it is in its lower retracted position. Lip 48 in part serves to protect the exposed end of slidable pin 32. Lip 48 also raises the body 22 off logs preventing the pin from hitting a log and failing to retract and release properly. Serving, in part, to lock slidable pin 32 in place in its uppermost position is the latch arm and knob combination. As previously noted, the end of cable 12 and knob 14 extend through eye 26 and when a cable is pulled outwardly to cause the knob 14 to abut the bottom end of eye 26 the dimensions of the choker hook assembly are then such that a surface on knob 14 can be positioned to impact the bottom surface of slidable pin 32. This is best seen by referring to FIG. 5. Here, when the cable and knob are snug against the bottom edge of latch arm 20 and when latch arm 20 is caused to rotate downwardly, eventually the resilient surface of the knob will impact the bottom surface of the slidable pin. As an operator continues to exert pressure on the latch arm, the cable and knob assembly will also be moved further downwardly and an upward force will will thereby be exerted on the bottom of slidable pin pushing it upwardly where it can be locked in place. As the knob is pushed upwardly it will traverse opening 50 and move upwardly within the confines of lip 48 which serves to channel the movement of knob 14. Once the pin has been locked in its uppermost position then the operator can retract the latch arm 20 and immediately cause the latch arm to be locked in place by rotating it to its fully locked position where aperture 30 engages the upwardly extending exposed end of slidable pin 32. After this step is accomplished then the operator can simply create his loop with the knob and cable and then insert the knob within the choker hook assembly using first the large opening 34 and then causing the knob and cable to move into the second opening 36 where the knob is then positioned against one or the other of the inclined faces 42, 44. Once this occurs, then tension can be applied to the cable and the loop will tighten about the object and thence moved. At the site where the object is to be released, a signal is sent to the receiver within choker body 22 which ultimately allows the support holding slidable pin in its uppermost position to be removed thereby forcing the pin downwardly which releases the latch arm from its locked position. Once the latch arm is released then the end of the cable and its knob will also be released as will the object being transported.

What has been described are several improvements to a remotely releasable choker hook assembly that first allows the assembly to be used in a much simpler fashion without requiring three hands, while the second allows the slidable pin to be hit by a springier knob and cable rather than a solid cocking cam, thus avoiding the very high impacts during "hand out," when the chokers are dragged through brush and stumps back out to be rehooked to logs. It may occur to those skilled in the art that various additional improvements are possible, arising out of the scope of the present disclosure and all such additional improvements together with the improvements disclosed herein are intended to be within the scope of the appended claims.

I claim:

1. A choker assembly of the type having a substantially closed body and a pivotally mounted latch arm on the outside of the body having an open position and a locked position where the locked position will capture and hold the end of a cable-ferrule combination running to the assembly, having the improvement comprising:
   a first opening in the choker assembly where the latch arm is the the locked position defined by a portion of the surface on the body and a portion of the inside surface on the latch arm and having a size large enough to allow the ferrule to pass therethrough,
   a second opening in the choker assembly where the latch arm is in the locked position adjacent the first opening defined by another portion of the surface on the body and a portion of the inside surface on the latch arm and having a size small enough to prevent the ferrule from passing therethrough, and
   a gap between the first and second openings when the latch arm is in the locked position having a size to allow the cable to pass therethrough but not the ferrule.

2. The improvement as in claim 1 further including a recessed portion within the second opening for accepting the cable to lock the cable end and ferrule in place.

3. The improvement as in claim 2 in which one pair of inclined faces are located on either side of the recessed portion for providing a support and holding surface for the ferrule.

4. The improvement as in claim 3 in which the inclined faces are preferably within a range of from 25°–35° when measured from a plane through the latch arm and body.

5. The improvement as in claim 3 in which a relief is located within the second opening between the inclined faces and on the choker body to provide further clearance for the cable.

6. The improvement as in claim 3 in which a second pair of inclined faces are located on either side of the recessed portion opposite of the first pair so as to provide a second support and holding surface so the cable and ferrule can enter either side of the choker hook assembly.

7. A choker assembly of the type having a substantially closed body within which slides a settable slidable pin and pivotally mounted latch arm on the outside of the body having an open position when the slidable pin is in its lowermost position and a locked position where the locked position will capture and hold the end of a cable-ferrule combination running to the assembly, having the improvement comprising:
   an eye on the outside of the pivotally mounted latch arm with the cable-ferrule combination extending therethrough and substantially inline with the slidable pin which can be reset from its lowermost position by rotating the latch arm about an angle so the ferrule contacts the bottom of the pin and then further rotating the latch arm to push the pin upwardly into its set position.

8. The improvement as in claim 7 further including a lip with an opening therein extending about the bottom edge of the body with the opening being substantially in line with the latch arm.

9. The improvement as in claim 8 in which the height of the lip is greater than the exposed height of the pin when it is in its lowermost position.

10. The improvement as in claim 7 in which the eye has an opening size sufficient to allow the cable to slide therethrough but not the ferrule.

11. The improvement as in claim 8 in which the ferrule length is sized so as to fit within the lip and to be guided thereby as it is forced upwardly against the bottom of the pin.

* * * * *